(12) United States Patent
Paoletti et al.

(10) Patent No.: US 10,548,431 B2
(45) Date of Patent: Feb. 4, 2020

(54) DELIVERY UNIT FOR AN APPARATUS FOR MAKING A BEVERAGE AND APPARATUS COMPRISING THAT DELIVERY UNIT

(71) Applicant: CAFFITALY SYSTEM S.P.A., Gaggio Montano (Bologna) (IT)

(72) Inventors: Luciano Paoletti, Florence (IT); Giovanni Zaccanti, Gaggio Montano (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 129 days.

(21) Appl. No.: 15/575,701

(22) PCT Filed: May 13, 2016

(86) PCT No.: PCT/IB2016/052786
§ 371 (c)(1),
(2) Date: Nov. 20, 2017

(87) PCT Pub. No.: WO2016/185347
PCT Pub. Date: Nov. 24, 2016

(65) Prior Publication Data
US 2018/0289207 A1 Oct. 11, 2018

(30) Foreign Application Priority Data

May 20, 2015 (IT) .......................... 102015000016122
Sep. 11, 2015 (IT) .......................... 102015000050735

(51) Int. Cl.
*A47J 31/46* (2006.01)
*A47J 31/44* (2006.01)
(Continued)

(52) U.S. Cl.
CPC .................. *A47J 31/46* (2013.01); *A23F 5/26* (2013.01); *A47J 31/34* (2013.01); *A47J 31/4496* (2013.01); *B01D 19/0042* (2013.01)

(58) Field of Classification Search
CPC ................................................ A47J 31/46–469
See application file for complete search history.

(56) References Cited

U.S. PATENT DOCUMENTS 6,799,504 B2 * 10/2004 Brouwer ............... A47J 31/467
99/275
7,591,217 B2 9/2009 Kodden et al.
(Continued)

FOREIGN PATENT DOCUMENTS

DE          10344328 A1    4/2005
DE     102005049244 A1    4/2007
(Continued)

*Primary Examiner* — Michael A Laflame, Jr.
(74) *Attorney, Agent, or Firm* — Pearne & Gordon LLP

(57) ABSTRACT

A delivery unit (1) for an apparatus for making a beverage, in particular for making an espresso coffee. The delivery unit (1) includes a cup-shaped body (2) delimiting an inner chamber (20), the cup-shaped body (2) including a lateral wall (21) and a bottom wall (23). The delivery unit (1) also includes an infeed spout (3) for introducing beverage into the inner chamber (20) and an outfeed opening (45) through which the beverage can come out of the inner chamber (20), the outfeed opening (45) being positioned in a central portion of the bottom wall (23). In the inner chamber (20) the delivery unit (1) includes a partition wall (5) which surrounds the outfeed opening (45) and divides the inner chamber (20) into a peripheral region (26) and a central region (28) in which the outfeed opening (45) is located. The partition wall (5) includes a plurality of passage openings (55) for allowing the beverage to pass from the peripheral region (26) to the central region (28). The infeed spout (3) is designed to introduce the beverage into the peripheral (Continued)

region (26) of the inner chamber (20) with a direction substantially tangential to the lateral wall (21).

17 Claims, 6 Drawing Sheets

(51) Int. Cl.
*A23F 5/26* (2006.01)
*A47J 31/34* (2006.01)
*B01D 19/00* (2006.01)

(56) References Cited

U.S. PATENT DOCUMENTS

| | | | |
|---|---|---|---|
| 7,958,815 B2 | 6/2011 | Kodden et al. | |
| 2005/0076783 A1 | 4/2005 | Kodden et al. | |
| 2006/0230942 A1* | 10/2006 | Noordhuis | A47J 31/0678 |
| | | | 99/275 |
| 2007/0131119 A1 | 6/2007 | Kodden et al. | |
| 2008/0289509 A1 | 11/2008 | Kodden et al. | |
| 2009/0007795 A1* | 1/2009 | Turpin | A47J 31/4485 |
| | | | 99/293 |
| 2014/0034676 A1* | 2/2014 | Verduin | A47J 31/46 |
| | | | 222/146.2 |
| 2014/0137749 A1* | 5/2014 | Marchi | A47J 31/4496 |
| | | | 99/302 R |
| 2014/0342068 A1* | 11/2014 | Smith | A47J 31/4496 |
| | | | 426/425 |
| 2015/0104550 A1* | 4/2015 | Oh | B65D 85/8043 |
| | | | 426/231 |
| 2016/0198891 A1* | 7/2016 | Buttiker | A47J 31/467 |
| | | | 99/323 |

FOREIGN PATENT DOCUMENTS

| | | |
|---|---|---|
| GB | 2475290 A | 5/2011 |
| WO | 03055366 A2 | 7/2003 |
| WO | 2005063089 A1 | 7/2005 |

* cited by examiner

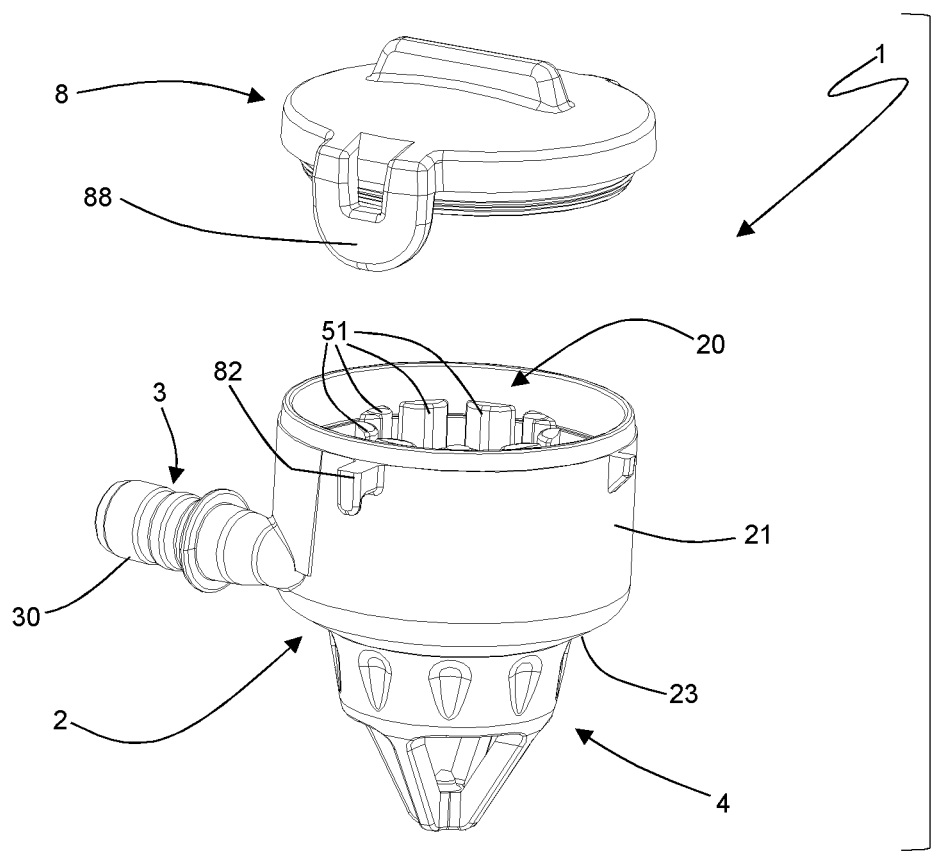
FIG. 4
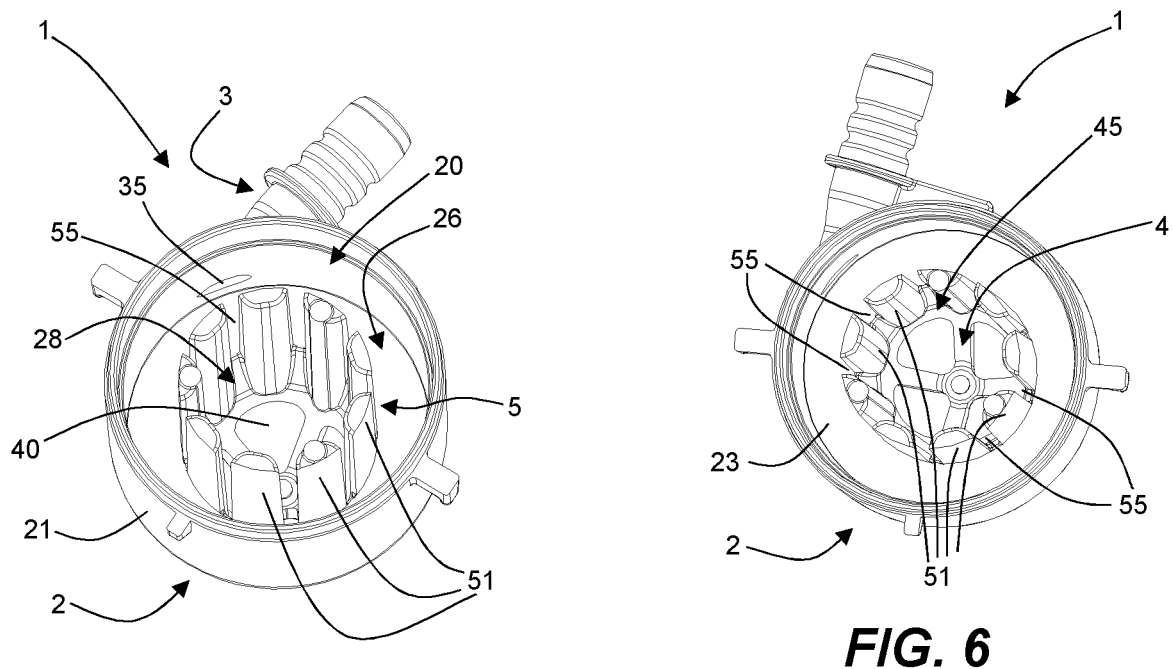
FIG. 5
FIG. 6

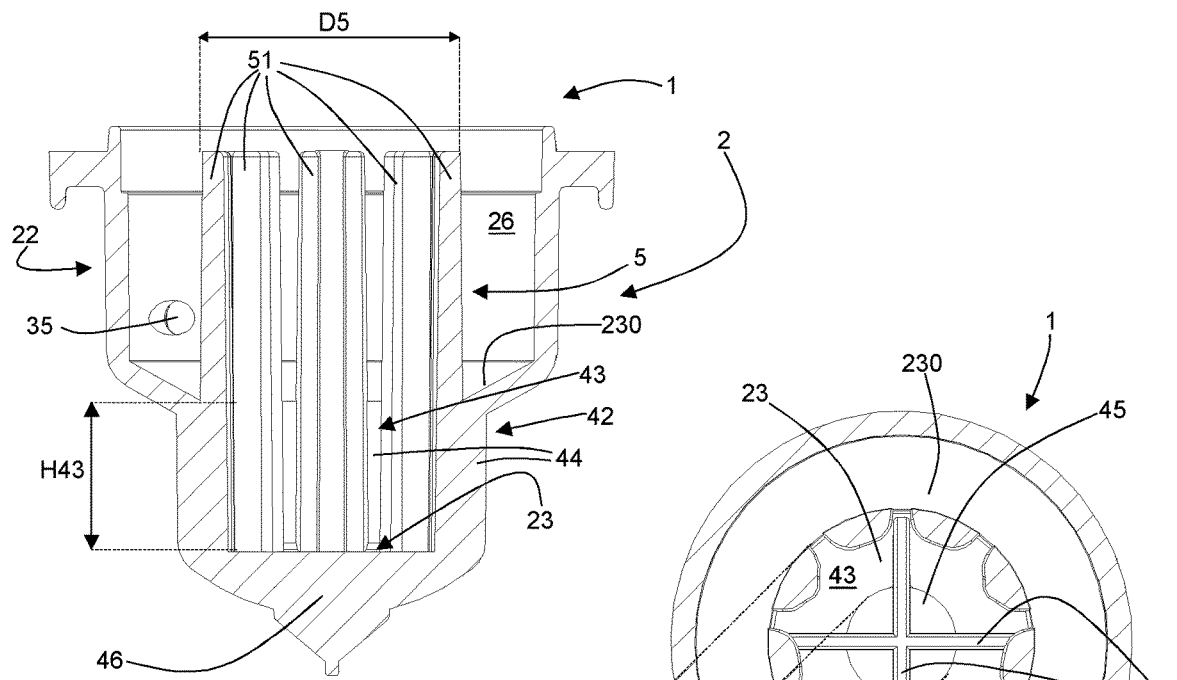

DELIVERY UNIT FOR AN APPARATUS FOR MAKING A BEVERAGE AND APPARATUS COMPRISING THAT DELIVERY UNIT

This invention relates in general to the sector of making beverages using apparatuses that perform infusion of a food substance. In particular, this invention relates to a delivery unit for such an apparatus, and to a machine comprising that delivery unit and a method for supplying a beverage. This invention has a specific application in apparatuses that perform pressurised infusion, in particular for making an espresso coffee.

Beverage-making apparatuses usually comprise an infusion chamber designed to receive a powdered food substance (for example, contained in a capsule, a pod or in another permeable or pierceable wrapper) and hot water which is injected into the infusion chamber for infusion of the food substance, thereby obtaining the beverage. An outfeed duct drains the beverage from the infusion chamber and carries it to a spout which delivers the beverage into a cup or other container from which the consumer can drink. The flow of beverage between the infusion chamber and the delivery spout is therefore a direct flow, which occurs entirely in the outfeed duct. The inventor of this invention has noticed that, in particular when the apparatus performs pressurised infusion, the beverage delivered contains many bubbles which are quite large. From the point of view of the consumer, that is considered a disagreeable aspect, which suggests that the beverage is of low quality.

That disadvantage is particularly felt when the beverage delivered is an espresso coffee. This is made at quite high pressures and consumers are usually demanding as regards its quality.

In this context, the technical purpose that forms the basis of this invention is to enable a beverage to be supplied which does not have that disadvantage or which is at least better than the beverages obtained with the prior art apparatuses.

The technical purpose specified and the aims indicated are substantially achieved by a delivery unit for an apparatus for making a beverage according to claim 1, by an apparatus according to claim 15 and by a method for supplying a beverage according to claim 18.

Particular embodiments of the subject matter of this invention are defined in the corresponding dependent claims.

According to one aspect of the solution proposed by this invention, after infusion and before delivery (that is to say, between the infusion chamber and the delivery spout) the beverage is introduced into a chamber that is substantially at atmospheric pressure. In that chamber, the beverage moves with a free surface between an introducing region and an outfeed region. In other words, the beverage in the chamber has an ample surface interfacing with the atmosphere in the chamber. That allows at least part of the air and/or vapour contained in the beverage to be released into the atmosphere of the chamber during the period for which the beverage remains in the chamber. Consequently, the beverage that comes out of the chamber has lost at least the largest bubbles and so appears to be of higher quality than the beverages made by delivery units with a direct flow such as those of the prior art.

Basically, the chamber is a degassing (or decanting) chamber that promotes the release of the gaseous phases from the beverage, thanks to the interface surface that is created between the beverage and the air in the chamber at atmospheric pressure and thanks to the simultaneous movement of the beverage towards the outfeed, said movement helping the bubbles in the liquid to reach the interface surface and helping to separate the liquid part of the beverage from the surface part which is full of bubbles.

Specifically, a delivery unit according to this invention comprises a cup-shaped body that delimits said chamber. In the chamber there is a partition wall which surrounds an outfeed opening and divides the chamber into a peripheral region, into which the beverage is introduced, and a central region in which the outfeed opening is located. The partition wall comprises a plurality of passage openings for allowing the beverage to pass from the peripheral region to the central region.

The partition wall prevents the beverage from immediately descending into the outfeed opening and also, if suitable dimensions are selected for the passage openings, the partition wall acts as a filtering member that keeps the larger bubbles in the peripheral region and prevents them from descending intact into the outfeed opening.

During use of the delivery unit, the beverage is introduced into the peripheral region (which in particular is an annular region) in a direction that is substantially tangential to the lateral wall of the cup-shaped body.

That is useful for extending the path of the beverage in the peripheral region and, consequently, the time for which it remains in the chamber. Moreover, to exit the chamber the beverage must change direction between a motion substantially tangential to the lateral wall and a substantially radial motion towards the central region. That change of direction facilitates separation of a liquid phase which moves on the bottom of the chamber and a phase full of bubbles that remains on the surface.

Further features and the advantages of this invention are more apparent in the detailed description below, with reference to an example, non-limiting embodiment of a delivery unit for an apparatus for making a beverage.

Reference will be made to the accompanying drawings, in which:

FIG. 4 is an exploded view of the delivery unit of FIG. 1, showing a body and a lid which are separated from each other;

FIG. 5 is a first perspective top view of the body of the delivery unit of FIG. 4;

FIG. 6 is a second perspective top view of the body of the delivery unit of FIG. 4;

FIG. 14 is a cross-sectional view of the body of the delivery unit, according to a section line XIV-XIV in FIG. 12;

FIG. 15 is a cross-sectional view of the body of the delivery unit, according to a cross-section line XV-XV in FIG. 13;

FIG. 16 is a perspective top view of an embodiment of a lid of a delivery unit according to this invention;

FIG. 17 is a perspective bottom view of the lid of FIG. 16.

Figure 1:
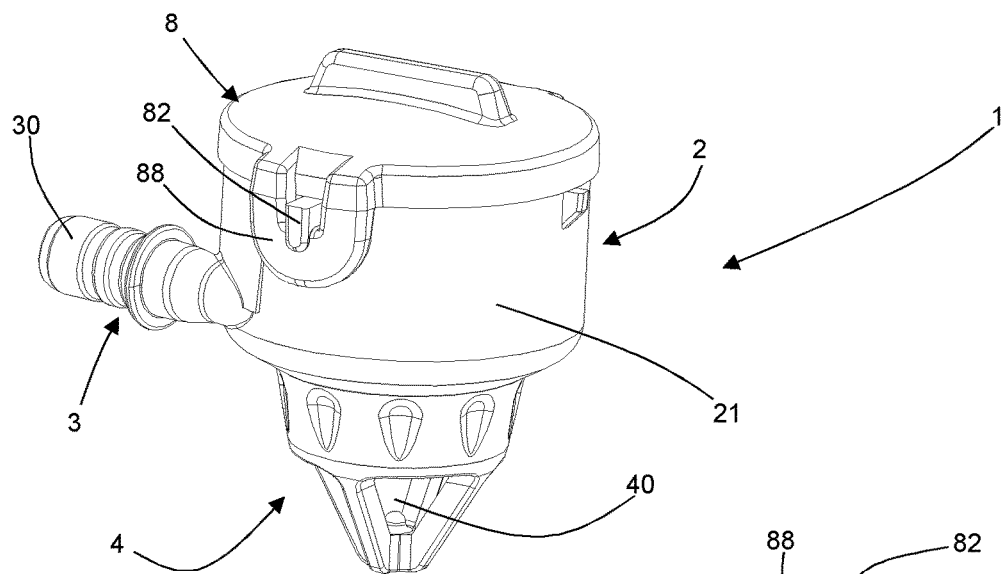
FIG. 1 is a perspective view of a first embodiment of a delivery unit according to this invention.
Figure 2:
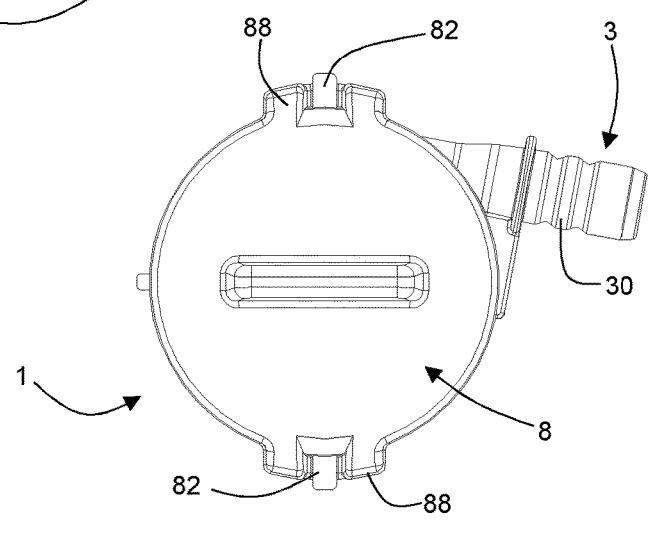
FIG. 2 is a top view of the delivery unit of FIG. 1.
Figure 3:
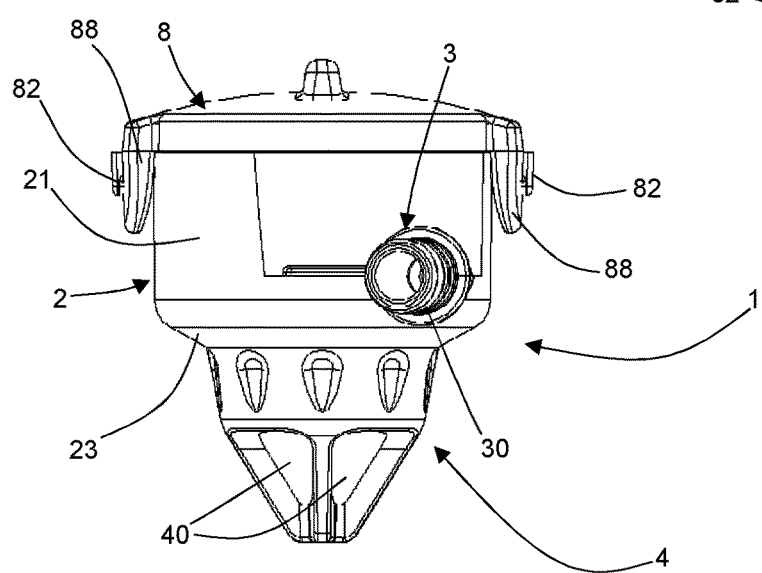
FIG. 3 is a side view of the delivery unit of FIG. 1.

With reference initially to FIGS. 1 to 10, the numeral 1 denotes a delivery unit according to this invention. The delivery unit 1 is intended for use in an apparatus for making a beverage, of the type comprising an infusion chamber in which a powdered food substance is infused with water (in particular, with pressurised hot water) to obtain the beverage. For example, the powdered food substance is contained in a capsule or in a pod, in particular of the single portion type, which is inserted in the infusion chamber before use and is removed from the infusion chamber after use.

The delivery unit 1 is connected to an outfeed duct of the infusion chamber of the apparatus. Therefore, the delivery unit 1 receives the beverage that is made in the infusion chamber and delivers it into a cup or other container, making the beverage available to a consumer.

In one embodiment, infusion is made under pressure and therefore the apparatus comprises a pump designed to pressurise the infusion water (that is to say, the water sent to the infusion chamber) to a pressure of at least 4 bar, in particular to a pressure of between 9 and 16 bar.

Specifically, that apparatus is a machine for making an espresso coffee. In this case, the powdered food substance is coffee powder. Infusion is performed at a pressure of at least 4 bar, in particular at a pressure of between 9 and 16 bar.

With the exclusion of the delivery unit 1, the remaining parts of the apparatus for making a beverage may be made according to the prior art and, therefore, are not described in further detail. Since the delivery unit 1 is applicable to existing prior art apparatuses, it does not appear to be necessary to supply a figure showing a beverage-making apparatus.

Hereinafter, specific reference will be made to a delivery unit 1 for a machine for making an espresso coffee. However, it shall be understood that the same principles which form the basis of this invention are similarly also applicable for making other beverages.

The delivery unit 1 comprises a cup-shaped body 2, to which a lid 8 is fixed, if necessary removable. The cup-shaped body 2 comprises a lateral wall 21 and a bottom wall 23. The bottom wall 23 is joined to a lower edge of the lateral wall 21. In particular, the bottom wall 23 is made in one piece with the lateral wall 21.

The lid 8 closes the top of the cup-shaped body 2, that is to say, the lid 8 is mounted on a top edge of the lateral wall 21. For example, the lid 8 is removably fixed to the cup-shaped body 2 by means of a tooth 82—tab 88 snap-on system. If necessary, the lid may not be present, or it may be made in one piece with the cup-shaped body.

The cup-shaped body 2 delimits an inner chamber 20, faced by the inner faces of the lateral wall 21, of the bottom wall 23 and of the lid 8.

In the embodiment illustrated, the lateral wall 21 has a substantially cylindrical shape, that is to say, it is a cylindrical shell portion, and the bottom wall 23 has a circular perimeter in plan view.

For example, the lateral wall 21 has a height H21 of 14 mm and a diameter D21 of 27 mm.

Alternatively, the lateral wall 21 may have a substantially frusto-conical shape. Other shapes, for example a hemispheric shape, are equally possible.

The delivery unit 1 also comprises an infeed spout 3 in communication with the inner chamber 20. The infeed spout 3 is connectable to an outfeed duct of the infusion chamber. During use, the beverage arriving from the infusion chamber is introduced into the inner chamber 20 through the infeed spout 3.

Figure 10:
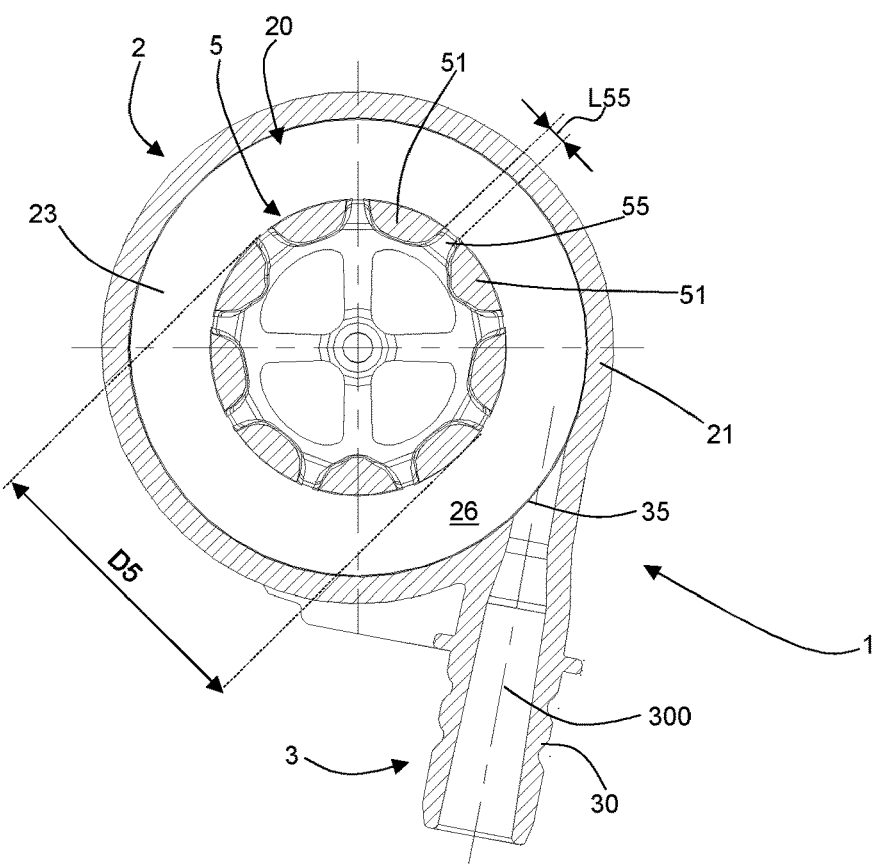
FIG. 10 is a cross-sectional view of the body of the delivery unit, according to a section line X-X in FIG. 9.
Figure 11:
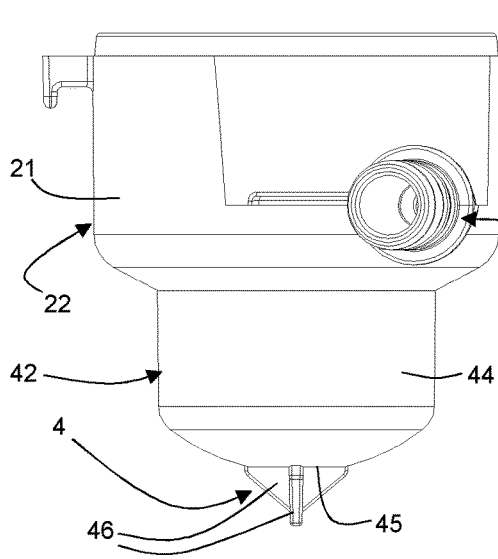
FIG. 11 is a side view of the body of a second embodiment of a delivery unit according to this invention; the lid of the delivery unit is not shown in this figure.
Figure 12:
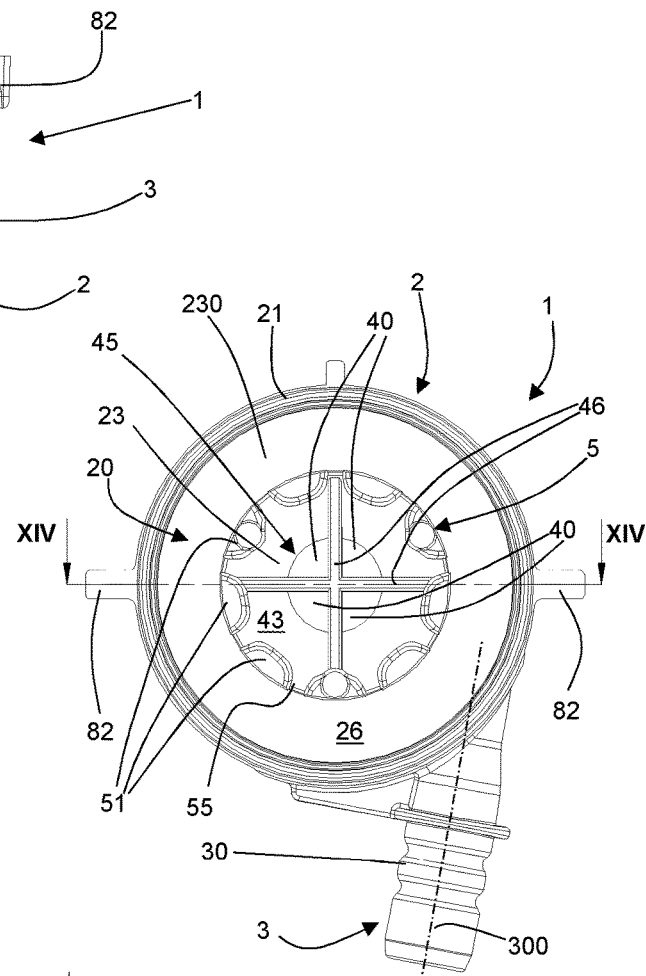
FIG. 12 is a top view of the body of the delivery unit of FIG. 11.
Figure 13:
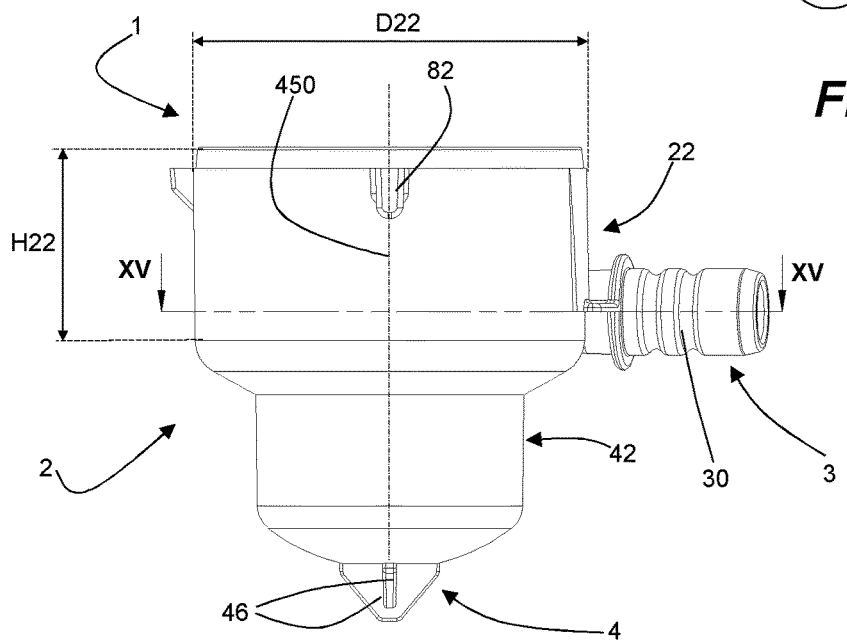
FIG. 13 is another side view of the body of the delivery unit of FIG. 11.

As shown in particular in FIG. 10, the infeed spout 3 is designed to introduce the beverage into the inner chamber 20 with a direction 300 substantially tangential to the lateral wall 21, that is to say, tangential to the inner face of the latter. In use, the beverage introduced into the inner chamber 20 is directed towards a region of the inner face of the lateral wall 21, said region being adjacent to the outlet of the infeed spout 3, rather than towards a central region of the inner chamber 20. That is useful for ensuring that the beverage introduced follows the inner face of the lateral wall 21 at least for a certain stretch, moving at the periphery of the inner chamber 20 so as to maximise the path and the time for which the beverage remains in the inner chamber 20.

Specifically, the beverage enters the inner chamber 20 through the lateral wall 21, which comprises a corresponding infeed opening 35, that is to say, a through hole passing through the thickness of the lateral wall 21. The infeed spout 3 is positioned at that infeed opening 35.

In particular, the infeed opening 35 is at a distance from the bottom wall 23. That is to say, the infeed opening 35 is not flush with the bottom wall 23 and is at a height higher (for example, at a distance D35 of 1.5 mm) than the join between the lateral wall 21 and the bottom wall 23. That is useful during use, for preventing the beverage which is entering from being introduced directly into the beverage already present in the inner chamber 20, that is to say, below the free surface of the beverage present. In fact, such introduction below the free surface would cause significant agitation of the beverage present and could create further bubbles in the beverage, risking compromising correct operation of the delivery unit 1.

In the embodiment illustrated, the infeed spout 3 comprises a tubular stretch 30 that extends outside the lateral wall 21. That is to say, the infeed spout 3 projects from the outer face of the lateral wall 21. In order to connect the delivery unit 1 to the outfeed duct of the infusion chamber, the tubular stretch 30 is designed to be inserted in an end stretch of the outfeed duct. The outer surface of the tubular stretch 30 comprises projections and grooves for increasing a watertight seal between the infeed spout 3 and that outfeed duct.

The tubular stretch 30 extends in such a way that it is substantially tangential to the lateral wall 21, so as to orient the direction 300 in which the beverage is introduced, making it substantially tangential to the inner face of the lateral wall 21.

In the embodiment illustrated, the infeed spout 3 does not project into the inner chamber 20. Therefore, the infeed spout 3 is completely outside the cup-shaped body 2 and the inner channel of the tubular stretch 30 is precisely aligned with the infeed opening 35.

In an alternative embodiment, the infeed spout 3 may extend into the inner chamber 20. In another embodiment, the outer tubular stretch 30 may not be present. The infeed spout 3 could even be constituted of only the infeed opening 35, in which the end stretch of the outfeed duct of the infusion chamber is inserted.

The delivery unit 1 also comprises an outfeed opening 45 through which the beverage can come out of the inner chamber 20. The outfeed opening 45 is positioned in a central portion of the bottom wall 23. In particular, in the embodiment illustrated, that outfeed opening 45 is a substantially circular hole which is concentric with the circular perimeter of the bottom wall 23. In use, the bottom wall 23 is a circular ring in plan view. The outfeed opening 45 has a significant passage cross-section, so that it does not obstruct beverage outflow in any way. For example, the outfeed opening 45 has a diameter that is approximately half the diameter of the inner chamber 20. In particular, the outfeed opening 45 has a diameter D45 of 12 mm.

To facilitate the outflow of the beverage, the bottom wall 23 slopes down from the lateral wall 21 towards the outfeed opening 45. In other words, in side view, the outfeed opening 45 is made in a portion of the bottom wall 23 that is at a height lower than that of the peripheral portion where the lateral wall 21 and the bottom wall 23 are joined. In the embodiment illustrated, the bottom wall 23 has a frusto-conical shape.

The delivery unit 1 further comprises an outfeed spout 4, which extends outside the bottom wall 23 and is in communication with the outfeed opening 45. After passing through the outfeed opening 45, the beverage passes into the outfeed spout 4 and falls into a cup or other container positioned under the outfeed spout 4. For example, as shown in the figures, the outfeed spout 4 is a hollow body having a shape that is roughly conical and is positioned below the outfeed opening 45.

The outfeed spout 4 is equipped with a plurality of openings 40 through which the beverage comes out of the delivery unit 1. The openings 40 occupy a very significant part of the surface of the outfeed spout 4. That is to say, they constitute a large passage cross-section, occupying more than half of the surface of the outfeed spout 4. That is useful for preventing the outfeed spout 4 from obstructing the outflow of the beverage. Moreover, thanks to the large dimensions of the outfeed opening 45 and of the openings 40 of the spout 4, even during beverage delivery, the pressure in the inner chamber 20 is equal to the atmospheric pressure outside the delivery unit 1.

In the inner chamber 20, the delivery unit 1 comprises a partition wall 5 which surrounds the outfeed opening 45. The partition wall 5, which extends in the inner chamber 20, emerging from the inner face of the bottom wall 23, divides the inner chamber 20 into a peripheral region 26 and a central region 28.

The peripheral region 26 is located between the lateral wall 21 and the partition wall 5, and is delimited at the bottom by the bottom wall 23. The infeed spout 3 introduces the beverage into that peripheral region 26.

The central region 28 is delimited by the partition wall 5 and the outfeed opening 45 is located on the bottom of the central region 28.

The partition wall 5 comprises a plurality of passage openings 55 for allowing the beverage to pass from the peripheral region 26 to the central region 28. Basically, during use, the beverage is introduced into the peripheral region 26 and, in order to exit through the outfeed opening 45, the beverage must pass through the partition wall 5.

In the embodiment illustrated, the partition wall 5 comprises a plurality of projections or teeth 51 which extend in the inner chamber 20 from the bottom wall 23. Basically, those teeth 51 project from the bottom wall 23 towards the inner chamber 20 and the lid 8.

The teeth 51 are positioned near to each other along an annular path around the outfeed opening 45. For example, said teeth 51 are positioned along a perimetric edge of the outfeed opening 45.

The teeth 51 are spaced out, therefore separated by gaps 55 constituting said passage openings for the beverage to pass from the peripheral region 26 to the central region 28. Basically, the partition wall 5 has a comb structure arranged in a loop.

The passage gaps or openings 55 are regularly positioned along the annular path around the outfeed opening 45. That is to say, the passage openings 55 are substantially evenly spaced.

For example, the partition wall 5 is made up of nine teeth 51. Each of the nine openings 55 formed between them has a width L55 of between 1 mm and 1.2 mm, in particular 1.15 mm.

In the embodiment illustrated, the partition wall 5 has a substantially cylindrical shape. For example, it has a diameter D5 of 15 mm. Therefore, the peripheral region 26 is an annular region, which in plan view has the shape of a circular ring and defines a ring-shaped path for the beverage introduced. Specifically, the lateral wall 21 and the partition wall 5 are coaxial. A similar annular peripheral region 26 is also obtained if the lateral wall 21 and/or the partition wall 5 have a substantially frusto-conical shape. Each passage opening 55 forms a respective beverage transit stretch which is substantially radial relative to a central axis 450 of the outfeed opening 45 and of the cup-shaped body 2. In use, each passage opening 55 forms a short channel between the peripheral region 26 and the central region 28. That channel is oriented in a substantially radial direction.

Figure 7:
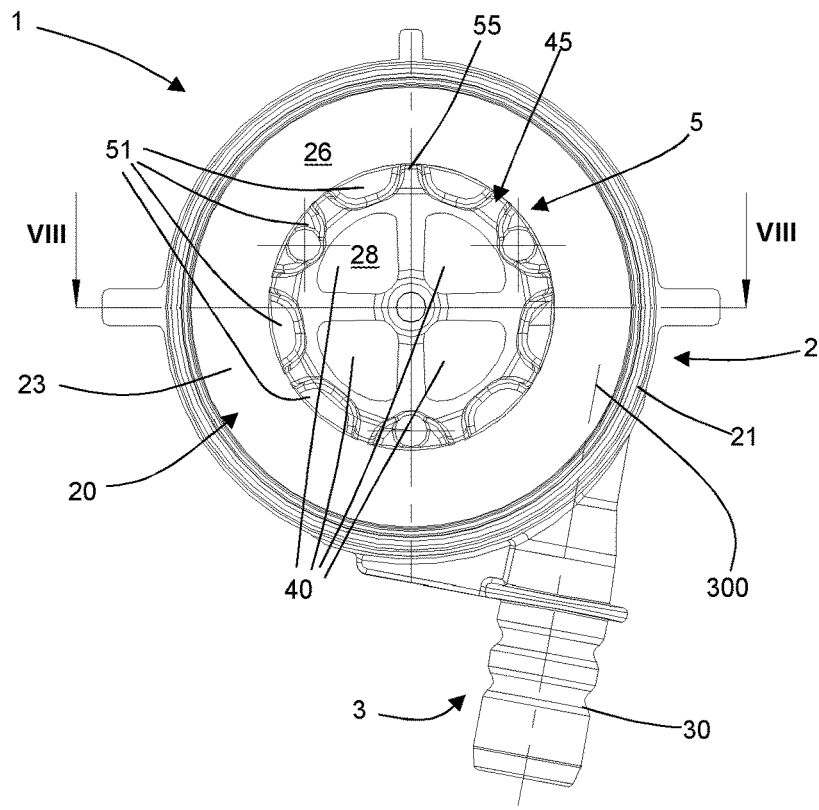
FIG. 7 is a top view of the body of the delivery unit of FIG. 4.
Figure 8:
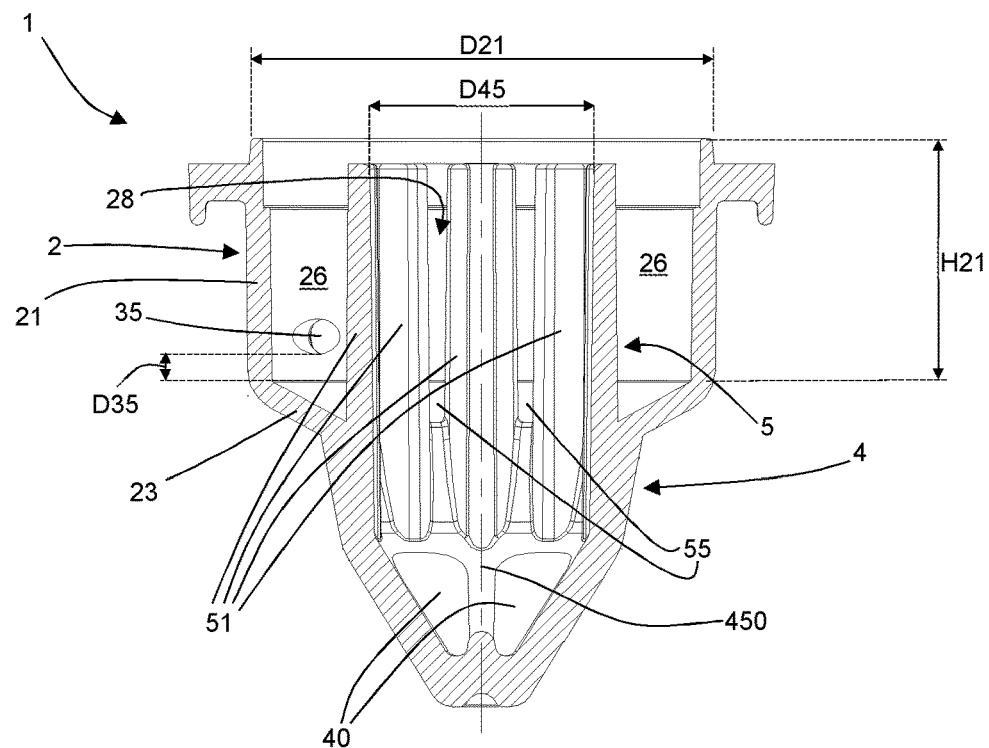
FIG. 8 is a cross-sectional view of the body of the delivery unit, according to a section line VIII-VIII in FIG. 7.
Figure 9:
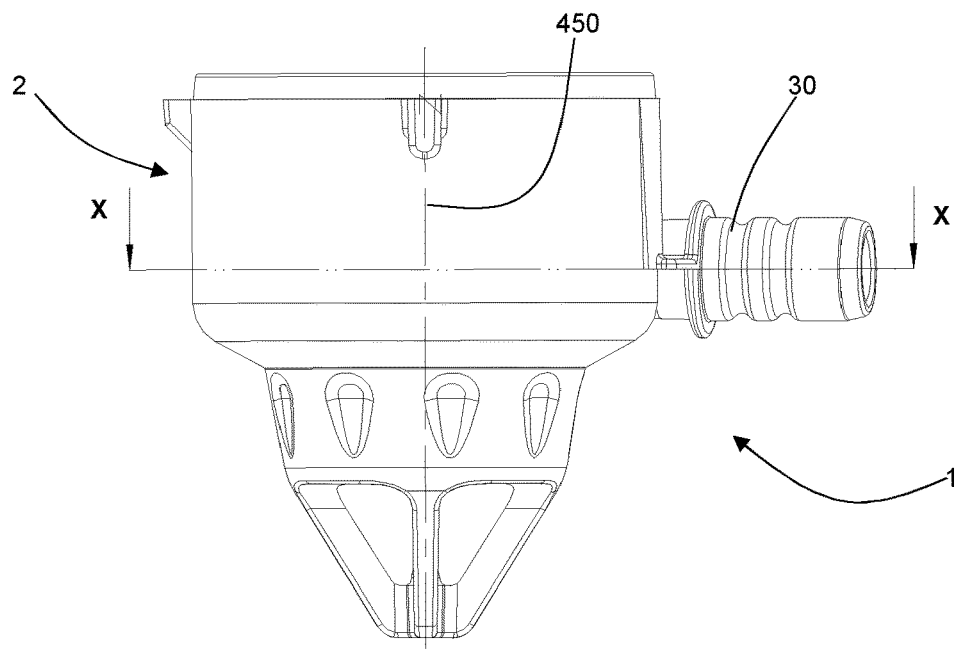
FIG. 9 is a side view of the body of the delivery unit of FIG. 1.

FIGS. 7 and 10 show how, in the specific embodiment illustrated, each tooth 51 has a first face which is facing the peripheral region 26 and a second face which is facing the central region 28. The first face has a slightly curved surface, with a radius of curvature that is centred on the central axis 450. The second face has a very curved surface, having the shape of a half-ellipse and a smaller radius of curvature. Thanks to the curved shape of that second face, said channel formed by the passage opening 55 between two successive teeth 51 widens towards the central region 28, that is to say, its cross-section increases.

Preferably, the delivery unit 1 is made of plastic material, for example by injection moulding. The partition wall 5 is made in one piece with the bottom wall 23 of the cup-shaped body.

For example, the lateral wall 21, the bottom wall 23 and the partition wall 5 have a thickness of approximately 1.5 mm.

A method for using the delivery unit 1 in combination with an apparatus for making a beverage is described below.

The beverage is made in the infusion chamber, where the powdered food substance located in the infusion chamber (for example, the food substance is contained in a capsule removably positioned in the infusion chamber) has a flow of pressurised heated water passed through it (for example with a temperature of between 70° C. and 90° C.). In particular, the powdered food substance is coffee powder and the heated water is sent with a pressure of at least 4 bar. The beverage obtained in this way is sent through a suitable outfeed duct from the infusion chamber and is introduced into the delivery unit 1 through the infeed spout 3.

The inner chamber 20 of the delivery unit 1 is at atmospheric pressure and therefore, due to the drop in pressure, part of the air dissolved in the beverage and water vapour tend to be released from the liquid phase, forming bubbles in the beverage.

Since the infeed spout 3 introduces the beverage in the peripheral region 26 in a direction tangential to the lateral wall 21, the beverage initially moves in the peripheral region 26 by following the lateral wall 21, with a curved flow substantially tangential to the lateral wall 21. The liquid part of the beverage, which is heavier, since it has little dissolved gaseous phase, flows on the bottom wall 23 towards the partition wall 5, passes through the passage openings 55, enters the central region 28 and falls into the outfeed opening 45, exiting through the outfeed spout 4. Meanwhile, the larger bubbles have time to burst and gradually all of the beverage is at least partly degassed and passes into the central region 28, then exits through the outfeed spout 4. Thanks to the degassing, the beverage exiting the delivery unit (in particular espresso coffee) is substantially free of large bubbles and so is of superior quality.

Since a movement in a radial direction is necessary to pass through the passage openings 55, the tangential introduction of the beverage prevents the beverage from exiting directly from the delivery unit without having remained for long enough in the peripheral region 26. In fact, the part of the beverage with the most bubbles remains on the surface and tends to gather in all of the peripheral region 26 (in particular moving with an annular flow, that is to say, along a ring-shaped path formed by the shape of the self-same peripheral region 26) and it gradually loses its bubbles and comes out through the outfeed opening 45. Moreover, the partition wall 5 and the teeth 51 stop the larger bubbles and keep them in the peripheral region 26. In fact, bubbles with dimensions larger than the width L55 of the passage openings 55 cannot pass through the self-same openings 55.

Basically, the inner chamber 20 is a degassing chamber and the distance between the introducing region (that is to say, the infeed opening 35) and the outfeed region (that is to say, the outfeed opening 45) forces the beverage to perform a movement with a free surface. That is to say, the moving beverage has a top surface that is an interface with the air at atmospheric pressure in the inner chamber 20. During the time for which the beverage remains in the inner chamber 20, the beverage loses at least part of the air and/or vapour that the beverage contains upon being introduced into the degassing chamber.

Moreover, during the movement between the introducing region and the outfeed region, the beverage passes through the partition wall 5, that is to say, through a member which prevents the passage of bubbles which have dimensions larger than the dimensions of the passage openings made in the self-same member.

Alternatively to what has been described, the partition wall 5 could, for example, be a net or a grille with small openings.

An alternative embodiment of a delivery unit 1 according to this invention is described with reference to FIGS. 11 to 15. The parts that have a structure and function identical or similar to corresponding parts of the embodiment described above are labelled using the same reference numerals and are not described again in detail.

The second embodiment shown in FIGS. 11 to 15 differs from the first embodiment shown in FIGS. 1 to 10 mainly in that it is shaped in such a way that the beverage which has passed through the passage openings 55 of the partition wall 5 is collected in a transit chamber 43 before flowing towards the outfeed opening 45. In contrast, in the first embodiment, the beverage falls directly into the outfeed spout 4 after passing through the passage openings 55.

Basically, in the second embodiment the cup-shaped body 2 has a top portion 22, in which the peripheral region 26 of the inner chamber 20 is located, which receives the beverage being fed in, and a bottom portion 42 extending below the top portion 22.

That bottom portion 42, which in particular is substantially cup-shaped and has a smaller diameter than the top portion 22, forms said transit chamber 43 (or additional chamber) which collects the beverage which has passed from the peripheral region 26 to the central region 28 of the inner chamber 20 and makes the beverage flow out towards the outfeed opening 45. Basically, the transit chamber 43 is interposed between the peripheral region 26 and the outfeed spout 4.

The transit chamber 43 is basically formed by the central region 28 which extends in the bottom portion 42 at a height lower than that of the peripheral region 26. Therefore, the bottom of the transit chamber 43 is at a height that is lower than that of the bottom wall 230 of the peripheral region 26. It should be noticed that said bottom wall 230 of the peripheral region 26 substantially has all of the features described for the bottom wall 23 of the first embodiment of the delivery unit 1.

The teeth 51 of the partition wall 5 are positioned on the inner face of a lateral wall 44 of the bottom portion 42 and project into the top portion 22, dividing the peripheral region 26 from the central region 28 similarly to what has already been described for the first embodiment.

The outfeed opening 45 is on the bottom of the transit chamber 43, that is to say, it is made in the bottom wall 23. The outfeed opening 45 has dimensions that are smaller than the bottom wall 23 and, in particular, is located at the centre of the latter. The bottom wall 23 therefore has an annular or circular ring shape and the outfeed opening 45 is at a distance from the lateral wall 44 (substantially cylindrical) of the transit chamber 43. The outfeed opening 45 of the second embodiment of the delivery unit 1 is smaller than the inner perimeter of the partition wall 5 and therefore defines a passage cross-section that is noticeably smaller than the dimensions of the outfeed opening 45 of the first embodiment of the delivery unit 1.

Since the outfeed opening 45 has dimensions smaller than the bottom wall 23, the beverage that falls into the transit chamber 43 through the passage openings 55 remains for a time in the transit chamber 43 before reaching the outfeed opening 45 and the outfeed spout 4 which extends outside the outfeed opening 45.

Basically, a part of beverage accumulates in the transit chamber 43 before exiting from the delivery unit 1. Therefore, the transit chamber 43, performing a beverage accumulation function, is useful for delivering the beverage from the outfeed spout 4 with a flow that is more continuous and more regular. That is in addition to the advantages already described above with reference to the first embodiment of the delivery unit 1.

To facilitate the outflow of the beverage, the bottom wall 23 slopes down from the lateral wall 44 towards the outfeed opening 45.

The bottom of the transit chamber 43 and the outfeed opening 45 are divided into four sectors by two diametric ribs 46 which cross each other perpendicularly. Specifically, the two diametric ribs 46 have shapes that are roughly triangular in side view and, coming out of the outfeed opening 45, form the outfeed spout 4.

Specifically, the bottom wall 23 and the outfeed opening 45 have a circular shape, the diameter D45 of the outfeed opening 45 is less than half of the diameter D23 of the bottom wall 23.

For example, the transit chamber 43 has a height H43 of 8.75 mm, the bottom wall 23 has a diameter D23 of 15.5 mm, the outfeed opening 45 has a diameter D45 of 6.5 mm. The other dimensions of the delivery unit 1 correspond to (or are substantially similar to) those already indicated above for the first embodiment. For example, the lateral wall of the top portion 22 has a height H22 of 15 mm and a diameter D22 of 27 mm. The partition wall 5 has a substantially cylindrical shape, for example with a diameter D5 of 15.7 mm. Specifically, the partition wall 5 is formed by nine teeth 51 and each of the nine openings 55 formed between them has a width L55 of between 1 mm and 1.2 mm, in particular 1.15 mm. As for the first embodiment, the teeth 51 extend towards the lid 8, until they almost touch the inner face of the lid 8.

FIGS. 16 and 17 show an embodiment of a lid 8 which is particularly suitable for the delivery unit of FIGS. 11 to 15, although it may also be used for the delivery unit of FIGS. 1 to 10. The lid 8 is intended to be fixed to the cup-shaped body 2 of the delivery unit 1, if necessary removably, for closing the top of the cup-shaped body 2 and the inner chamber 20.

That lid 8, for example made of silicone, comprises at least one through hole 85 passing through the thickness of the self-same lid 8 and putting in communication the central region 28 of the inner chamber 20 and the environment outside the delivery unit 1. In the embodiment illustrated, the lid 8 has two through holes 85 which are positioned symmetrically relative to the centre of the lid 8. For example, the through holes 85 each have a diameter D85 of 2.5 mm and, moreover, the centres of the two through holes 85 are separated by a distance L85 of 8.5 mm. Therefore, both of the through holes 85 are located above the central region 28 delimited by the partition wall 5.

Basically, those through holes 85 enable air or steam to be vented from the central region 28 (and in particular from the transit chamber 43) towards the outside. Specifically, during use of the delivery unit 1 at least part of the gaseous phase that is released by the beverage, or that in any case reaches the inner chamber 20 together with the beverage, can come out through the one or more holes 85 in the lid 8.

That is advantageous for further reducing the bubbles in the beverage delivered through the outfeed spout 4.

It is particularly useful to use the lid 8 having one or more through holes 85 in combination with the delivery unit 1 of FIGS. 11 to 15, since the presence of those one or more through holes 85 makes it possible to at least partly compensate for the smaller passage cross-section for beverage outfeed (compared with the first embodiment) due to the smaller dimensions of the outfeed opening 45. Therefore, the through holes 85 help to ensure that even during delivery of the beverage the pressure in the central region 28 and in the transit chamber 43 is substantially equal to the atmospheric pressure outside the delivery unit 1.

This invention brings important advantages.

In fact, the delivery unit, the apparatus and the method according to this invention enable a beverage to be supplied which has small bubbles, or even no bubbles, thereby satisfying the requirements and expectations of consumers as regards beverage quality.

A further advantage is the fact that said aim can be achieved without the need to alter the operation of the infusion chamber and, therefore, a delivery unit according to this invention is easy to apply even to existing apparatuses and machines.

Finally, it should be noticed that this invention is relatively easy to produce and that even the cost linked to implementing the invention is not very high.

The invention described above may be modified and adapted in several ways without thereby departing from the scope of the inventive concept.

All details of the invention may be substituted with other technically equivalent elements and the materials used, as well as the shapes and dimensions of the various components, may vary according to requirements.

The invention claimed is:

1. A delivery unit (1) for an apparatus for making a beverage, in particular for making an espresso coffee, the delivery unit (1) comprising:
   a cup-shaped body (2) delimiting an inner chamber (20), the cup-shaped body (2) comprising a lateral wall (21) and a bottom wall (23);
   an infeed spout (3) for introducing beverage into the inner chamber (20);
   an outfeed opening (45) through which the beverage can come out of the inner chamber (20), the outfeed opening (45) being positioned in a central portion of the bottom wall (23);
   a partition wall (5) located in the inner chamber (20) and surrounding the outfeed opening (45), the partition wall (5) dividing the inner chamber (20) into a peripheral region (26) and a central region (28), the outfeed opening (45) being in the central region (28),
   wherein the infeed spout (3) is designed to introduce the beverage into the peripheral region (26) of the inner chamber (20) with a direction substantially tangential to the lateral wall (21); and
   wherein the partition wall (5) comprises a plurality of passage openings (55) for allowing the beverage to pass from the peripheral region (26) to the central region (28).

2. The delivery unit (1) according to claim 1, wherein said passage openings (55) are regularly positioned along an annular path around the outfeed opening (45), the passage openings (55) being substantially evenly spaced.

3. The delivery unit (1) according to claim 1, wherein the partition wall (5) comprises a plurality of projections or teeth (51) extending in the inner chamber (20) from the bottom wall (23), said projections or teeth (51) being positioned near to one another along an annular path around the outfeed opening (45), said projections or teeth (51) being at a distance from one another and said passage openings (55) being gaps between said projections or teeth (51).

4. The delivery unit (1) according to claim 1, wherein each of said passage openings (55) forms a respective beverage transit stretch which is substantially radial relative to a central axis (450) of the outfeed opening (45).

5. The delivery unit (1) according to claim 1, wherein the infeed spout (3) is positioned at an infeed opening (35) located in the lateral wall (21).

6. The delivery unit (1) according to claim 5, wherein the infeed spout (3) extends outside the lateral wall (21) with at least one stretch (30) which is substantially tangential to the lateral wall (21).

7. The delivery unit (1) according to claim 5, wherein said infeed opening (35) is at a distance from the bottom wall (23).

8. The delivery unit (1) according to claim 1, wherein the lateral wall (21) and the partition wall (5) are substantially cylindrical or substantially frusto-conical, the lateral wall (21) and the partition wall (5) being coaxial and the peripheral region (26) being an annular region.

9. The delivery unit (1) according to claim 1, wherein the bottom wall (23) is sloping from the lateral wall (21) towards the outfeed opening (45).

10. The delivery unit (1) according to claim 1, comprising an outfeed spout (4) extending outside the bottom wall (23) and in communication with the outfeed opening (45).

11. The delivery unit (1) according to claim 1, wherein the cup-shaped body (2) comprises a bottom portion (42) in which the central region (28) extends at a height lower than the peripheral region (26), said bottom portion (42) forming a transit chamber (43) intended to collect the beverage that has passed from the peripheral region (26) to the central region (28) and to make the beverage flow towards the outfeed opening (45).

12. The delivery unit (1) according to claim 11, wherein the outfeed opening (45) is on the bottom of the transit chamber (43) and its dimensions are smaller than the bottom wall (23) of the transit chamber (43), the bottom wall (23) having an annular shape and the transit chamber (43) comprising a lateral wall (44) that is at a distance from the outfeed opening (45).

13. The delivery unit (1) according to claim 12, wherein the bottom wall (23) of the transit chamber (43) and the outfeed opening (45) have a circular shape, the diameter (D45) of the outfeed opening (45) being less than half of the diameter (D23) of the bottom wall (23).

14. The delivery unit (1) according to claim 1, comprising a lid (8) fixed to the cup-shaped body (2), wherein the lid (8) comprises at least one through hole (85) which puts in communication the central region (28) of the inner chamber (20) and an environment outside the delivery unit (1).

15. An apparatus for making a beverage, comprising an infusion chamber designed for making a beverage by infusion of a food substance with water, the apparatus also comprising a delivery unit (1) according to claim 1, wherein the infeed spout (3) of the delivery unit (1) is connected to an outfeed duct of the infusion chamber.

16. The apparatus according to claim 15, also comprising a pump designed to pressurise infusion water to a pressure of at least 4 bar.

17. The apparatus according to claim 15, the apparatus being a machine for making an espresso coffee.

* * * * *